US012136391B2

(12) United States Patent
Kim

(10) Patent No.: US 12,136,391 B2
(45) Date of Patent: Nov. 5, 2024

(54) PIXEL CIRCUIT

(71) Applicant: Samsung Display Co., Ltd., Yongin-si (KR)

(72) Inventor: Keunwoo Kim, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/982,931

(22) Filed: Nov. 8, 2022

(65) Prior Publication Data

US 2023/0245616 A1 Aug. 3, 2023

(30) Foreign Application Priority Data

Jan. 28, 2022 (KR) ........................ 10-2022-0013233

(51) Int. Cl.
*G09G 3/3233* (2016.01)
*G09G 3/30* (2006.01)
(Continued)

(52) U.S. Cl.
CPC ............. *G09G 3/3233* (2013.01); *G09G 3/30* (2013.01); *G09G 3/32* (2013.01); *G09G 3/3258* (2013.01);
(Continued)

(58) Field of Classification Search
CPC ............. G09G 3/32; G09G 2300/0842; G09G 2320/0247; G09G 3/30; G09G 3/3233;
(Continued)

(56) References Cited

U.S. PATENT DOCUMENTS

| | | | | |
|---|---|---|---|---|
| 10,332,452 | B2 * | 6/2019 | Wang | G09G 3/3233 |
| 2017/0148379 | A1 * | 5/2017 | Cho | G09G 3/3233 |
| 2017/0270853 | A1 * | 9/2017 | Xiang | G09G 3/3258 |
| 2018/0033370 | A1 * | 2/2018 | Zheng | G09G 3/3233 |
| 2019/0012963 | A1 * | 1/2019 | Chen | G09G 3/3233 |
| 2019/0147799 | A1 * | 5/2019 | Kim | G09G 3/3266 345/55 |
| 2021/0036080 | A1 | 2/2021 | Kim et al. | |
| 2021/0057502 | A1 | 2/2021 | Kim et al. | |
| 2021/0287605 | A1 | 9/2021 | Wang et al. | |

(Continued)

FOREIGN PATENT DOCUMENTS

| | | |
|---|---|---|
| CN | 112310169 A | 2/2021 |
| CN | 112419972 A | 2/2021 |

(Continued)

OTHER PUBLICATIONS

Extended European Search Report for Application No. 23150673.4-1210 dated Apr. 13, 2023.

*Primary Examiner* — Jason M Mandeville
(74) *Attorney, Agent, or Firm* — CANTOR COLBURN LLP

(57) ABSTRACT

A pixel circuit includes a light emitting element, a driving transistor which applies a driving current to the light emitting element, a write transistor which receives a write gate signal and a data voltage and is connected to a first electrode of the driving transistor, a first compensation transistor which receives a compensation gate signal and is connected to a second electrode of the driving transistor and a first electrode of a second compensation transistor, the second compensation transistor which receives the compensation gate signal, and is connected to the second electrode of the first compensation transistor and a control electrode of the driving transistor, a storage capacitor which receives a first power voltage and is connected to the control electrode of the driving transistor, and a node control transistor which (Continued)

receives the write gate signal and is connected to the second electrode of the first compensation transistor.

8 Claims, 10 Drawing Sheets

(51) Int. Cl.
*G09G 3/32* (2016.01)
*G09G 3/3258* (2016.01)

(52) U.S. Cl.
CPC ............... *G09G 2300/0819* (2013.01); *G09G 2300/0842* (2013.01); *G09G 2300/0852* (2013.01); *G09G 2310/0251* (2013.01); *G09G 2320/0247* (2013.01)

(58) Field of Classification Search
CPC ............... G09G 3/3258; G09G 3/3266; G09G 2300/0426; G09G 2300/0819; G09G 2300/0852; G09G 2310/0251; H10K 50/805; H10K 59/1213; H10K 59/1216
USPC ...................................................... 345/55, 76
See application file for complete search history.

(56) References Cited

U.S. PATENT DOCUMENTS

| | | | | |
|---|---|---|---|---|
| 2021/0375201 | A1 | 12/2021 | Park et al. | |
| 2023/0048014 | A1 | 2/2023 | Wang et al. | |
| 2023/0343294 | A1* | 10/2023 | Guo | G09G 3/3266 |
| 2023/0419893 | A1* | 12/2023 | Wang | G09G 3/3233 |

FOREIGN PATENT DOCUMENTS

| | | | |
|---|---|---|---|
| CN | 215182990 | U | 12/2021 |
| KR | 1020180023098 | A | 3/2018 |
| KR | 1020210014817 | A | 2/2021 |
| KR | 1020210022807 | A | 3/2021 |
| KR | 1020210114578 | A | 9/2021 |
| WO | 2021218918 | A1 | 11/2021 |

* cited by examiner

PIXEL CIRCUIT

This application claims priority to Korean Patent Application No. 10-2022-0013233, filed on Jan. 28, 2022, and all the benefits accruing therefrom under 35 U.S.C. § 119, the content of which in its entirety is herein incorporated by reference.

BACKGROUND

1. Field

Embodiments of the invention relate to a pixel circuit in a display device. More particularly, embodiments of the invention relate to a pixel circuit including a driving transistor, a write transistor, a compensation transistor, a gate transistor, and the like.

2. Description of the Related Art

Generally, a display device may include a display panel, a driving controller, gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The driving controller may control the gate driver and the data driver.

In general, a pixel circuit included in a display device may include a light emitting element, a storage capacitor, a driving transistor, a write transistor, a compensation transistor, a gate initialization transistor, and the like. In the pixel circuit, where the transistors in the pixel circuit are low temperature poly silicon (LTPS) transistors, flicker may occurs when the display device is driven at less than a predetermined driving frequency (e.g., less than 30 Hz). In other words, since a leakage current flows through the transistors even when the transistors are turned off, a voltage stored in the storage capacitor (i.e., a voltage of a control electrode of the driving transistor) by the leakage current may be varied, and accordingly, a user may recognize the change in luminance. In particular, when the pixel circuit includes a structure in which the pixel circuit sequentially performs a gate initialization operation, a data writing operation, and a light emitting operation (e.g., the control electrode of the driving transistor, one electrode of the storage capacitor, one electrode of the gate initialization transistor, and one electrode of the compensation transistor are connected to a predetermined node), although the compensation transistor is in an off-state, a leakage current may flow through the compensation transistor and the voltage stored in the storage capacitor (i.e., the voltage of the control electrode of the driving transistor) may be varied.

SUMMARY

A conventional pixel circuit may reduce the leakage current flowing through the compensation transistor by configuring the compensation transistor as a dual. However, when the display device operates at less than a predetermined driving frequency, there is a limit in that an effect of reducing the leakage current is insignificant.

Embodiments of the invention provide a pixel circuit that minimizes a change in a voltage of a control electrode of a driving transistor due to a leakage current.

Embodiments of the invention also provide a display device that prevents flicker perceived by a user by including a pixel circuit that minimizes a change in voltage of a control electrode of a driving transistor due to a leakage current.

According to embodiments of the invention, a pixel circuit includes a light emitting element, a driving transistor which applies a driving current to the light emitting element, a write transistor including a control electrode which receives a write gate signal, a first electrode connected to a first electrode of the driving transistor, and a second electrode which receive a data voltage, a first compensation transistor including a control electrode which receives a compensation gate signal, a first electrode connected to a second electrode of the driving transistor, and a second electrode connected to a first electrode of a second compensation transistor, the second compensation transistor including a control electrode which receives the compensation gate signal, the first electrode connected to the second electrode of the first compensation transistor, and a second electrode connected to a control electrode of the driving transistor, a storage capacitor including a first electrode which receives a first power voltage and a second electrode connected to the control electrode of the driving transistor, and a node control transistor including a control electrode which receives the write gate signal, a first electrode connected to the second electrode of the first compensation transistor, and a second electrode.

In an embodiment, a first initialization voltage may be applied to the second electrode of the node control transistor.

In an embodiment, the pixel circuit may further include a gate initialization transistor including a control electrode which receives an initialization gate signal, a first electrode connected to the control electrode of the driving transistor, and a second electrode which receives a second initialization voltage, and the second electrode of the node control transistor may be connected to the first electrode of the gate initialization transistor.

In an embodiment, the write transistor, the first compensation transistor, and the second compensation transistor may be turned on from an off-state to an on-state when the gate initialization transistor is in the on-state in a non-emission period in which a gate initialization operation and a data writing operation are performed.

In an embodiment, the node control transistor, the first compensation transistor, and the second compensation transistor may be in an on-state in a first data writing period of a non-emission period in which a gate initialization operation and a data writing operation are performed, and the node control transistor may be in an off-state and the first compensation transistor and the second compensation transistor may be in the on-state in a second data writing period of the non-emission period after the first data writing period.

In an embodiment, the pixel circuit may further includes an anode initialization transistor including a control electrode which receives a bias signal, a first electrode connected to an anode electrode of the light emitting element, and a second electrode which receives a first initialization voltage, a gate initialization transistor including a control electrode which receives an initialization gate signal, a first electrode connected to the control electrode of the driving transistor, and a second electrode which receives a second initialization voltage, a first emission transistor including a control electrode which receives an emission signal, a first electrode which receives the first power voltage, and a second electrode connected to the first electrode of the driving transistor, a second emission transistor including a control electrode which receives the emission signal, a first electrode connected to the second electrode of the driving transistor, and a second electrode connected to the anode electrode of the light emitting element, and a bias transistor including a control electrode which receives the bias signal, a first electrode which receives a bias voltage, and a second electrode connected to the first electrode of the driving transistor.

In an embodiment, the gate initialization transistor may be configured as a dual.

In an embodiment, a frequency of the bias signal may be greater than a frequency of the write gate signal.

According to embodiments, a pixel circuit may include a light emitting element, a driving transistor which applies a driving current to the light emitting element, an anode initialization transistor including a control electrode which receives a bias signal, a first electrode connected to an anode electrode of the light emitting element, and a second electrode which receives a first initialization voltage, a first compensation transistor including a control electrode which receives a compensation gate signal, a first electrode connected to a second electrode of the driving transistor, and a second electrode connected to a first electrode of a second compensation transistor, the second compensation transistor including a control electrode which receives the compensation gate signal, the first electrode connected to the second electrode of the first compensation transistor, and a second electrode connected to a control electrode of the driving transistor, a storage capacitor including a first electrode which receives a first power voltage and a second electrode connected to the control electrode of the driving transistor, and a node control transistor including a control electrode which receives the bias signal, a first electrode connected to the control electrode of the driving transistor, and a second electrode connected to the second electrode of the first compensation transistor.

In an embodiment, the node control transistor may be turned on from an off-state to an on-state after a gate initialization operation and a data writing operation are performed in a non-emission period in which the gate initialization operation and the data writing operation are performed.

In an embodiment, the pixel circuit may further include a write transistor including a control electrode which receives a write gate signal, a first electrode connected to a first electrode of the driving transistor, and a second electrode which receives a data voltage, a gate initialization transistor including a control electrode which receives an initialization gate signal, a first electrode connected to the control electrode of the driving transistor, and a second electrode which receives a second initialization voltage, a first emission transistor including a control electrode which receives an emission signal, a first electrode which receives the first power voltage, and a second electrode connected to the first electrode of the driving transistor, a second emission transistor including a control electrode which receives the emission signal, a first electrode connected to the second electrode of the driving transistor, and a second electrode connected to the anode electrode of the light emitting element, and a bias transistor including a control electrode which receives the bias signal, a first electrode which receives a bias voltage, and a second electrode connected to the first electrode of the driving transistor.

In an embodiment, the write transistor, the first compensation transistor, and the second compensation transistor may be turned on from an off-state to an on-state when the gate initialization transistor is in the on-state in a non-emission period in which a gate initialization operation and a data writing operation are performed.

In an embodiment, the gate initialization transistor may be configured as a dual.

In an embodiment, a frequency of the bias signal may be greater than a frequency of the write gate signal.

According to embodiments, a pixel circuit may include a light emitting element, a driving transistor which applies a driving current to the light emitting element, a write transistor including a control electrode which receives a write gate signal, a first electrode connected to a first electrode of the driving transistor, and a second electrode which receives a data voltage, a first compensation transistor including a control electrode which receives a the write gate signal, a first electrode connected to a second electrode of the driving transistor, and a second electrode connected to a first electrode of a second compensation transistor, the second compensation transistor including a control electrode which receives a compensation gate signal, the first electrode connected to the second electrode of the first compensation transistor, and a second electrode connected to a control electrode of the driving transistor, a storage capacitor including a first electrode which receives a first power voltage and a second electrode connected to the control electrode of the driving transistor, and a node control capacitor including a first electrode which receives the first power voltage, and a second electrode connected to the second electrode of the first compensation transistor.

In an embodiment, a capacitance of the storage capacitor may be greater than a capacitance of the node control capacitor.

In an embodiment, the first compensation transistor and the second compensation transistor may be in an on-state in a first data writing period of a non-emission period in which a gate initialization operation and a data writing operation are performed, and the first compensation transistor may be in an off-state and the second compensation transistor may be in the on-state in a second data writing period of the non-emission period after the first data writing period.

In an embodiment, the pixel circuit may further include an anode initialization transistor including a control electrode which receives a bias signal, a first electrode connected to an anode electrode of the light emitting element, and a second electrode which receives a first initialization voltage, a gate initialization transistor including a control electrode which receives an initialization gate signal, a first electrode connected to the control electrode of the driving transistor, and a second electrode which receives a second initialization voltage, a first emission transistor including a control electrode which receive an emission signal, a first electrode which receives the first power voltage, and a second electrode connected to the first electrode of the driving transistor, a second emission transistor including a control electrode which receives the emission signal, a first electrode connected to the second electrode of the driving transistor, and a second electrode connected to the anode electrode of the light emitting element, and a bias transistor including a control electrode which receives the bias signal, a first electrode which receives a bias voltage, and a second electrode connected to the first electrode of the driving transistor.

In an embodiment, the write transistor, the first compensation transistor, and the second compensation transistor may be turned on from an off-state to an on-state when the gate initialization transistor is in the on-state in a non-emission period in which a gate initialization operation and a data writing operation are performed.

In an embodiment, the gate initialization transistor may be configured as a dual.

In embodiments of the invention, the pixel circuit may lower a voltage at a node between the first compensation transistor and the second compensation transistor by including a light emitting element, a driving transistor which apply a driving current to the light emitting element, a write transistor including a control electrode which receives a write gate signal, a first electrode connected to a first electrode of the driving transistor, and a second electrode which receives a data voltage, a first compensation transistor including a control electrode which receive a compensation gate signal, a first electrode connected to a second electrode of the driving transistor, and a second electrode connected to a first electrode of a second compensation transistor, the second compensation transistor including a control electrode which receives the compensation gate signal, the first electrode connected to the second electrode of the first compensation transistor, and a second electrode connected to a control electrode of the driving transistor, a storage capacitor including a first electrode which receives a first power voltage and a second electrode connected to the control electrode of the driving transistor, and a node control transistor including a control electrode which receives the write gate signal, a first electrode connected to the second electrode of the first compensation transistor, and a second electrode. Accordingly, a change in a voltage of the control electrode of the driving transistor due to a leakage current may be minimized.

In such embodiments, the pixel circuit may lower a voltage at a node between the first compensation transistor and the second compensation transistor by including a light emitting element, a driving transistor which applies a driving current to the light emitting element, an anode initialization transistor including a control electrode which receives a bias signal, a first electrode connected to an anode electrode of the light emitting element, and a second electrode which receive a first initialization voltage, a first compensation transistor including a control electrode which receives a compensation gate signal, a first electrode connected to a second electrode of the driving transistor, and a second electrode connected to a first electrode of a second compensation transistor, the second compensation transistor including a control electrode which receives the compensation gate signal, the first electrode connected to the second electrode of the first compensation transistor, and a second electrode connected to a control electrode of the driving transistor, a storage capacitor including a first electrode which receives a first power voltage and a second electrode connected to the control electrode of the driving transistor, and a node control transistor including a control electrode which receives the bias signal, a first electrode connected to the control electrode of the driving transistor, and a second electrode connected to the second electrode of the first compensation transistor. Accordingly, a change in a voltage of the control electrode of the driving transistor due to a leakage current may be minimized.

In such embodiments, the pixel circuit may lower a voltage at a node between the first compensation transistor and the second compensation transistor by including a light emitting element, a driving transistor which applies a driving current to the light emitting element, a write transistor including a control electrode which receives a write gate signal, a first electrode connected to a first electrode of the driving transistor, and a second electrode which receives a data voltage, a first compensation transistor including a control electrode which receives a the write gate signal, a first electrode connected to a second electrode of the driving transistor, and a second electrode connected to a first electrode of a second compensation transistor, the second compensation transistor including a control electrode which receives a compensation gate signal, the first electrode connected to the second electrode of the first compensation transistor, and a second electrode connected to a control electrode of the driving transistor, a storage capacitor including a first electrode which receives a first power voltage and a second electrode connected to the control electrode of the driving transistor, and a node control capacitor including a first electrode which receives the first power voltage, and a second electrode connected to the second electrode of the first compensation transistor. Accordingly, a change in a voltage of the control electrode of the driving transistor due to a leakage current may be minimized.

In such embodiments, the pixel circuit may minimizes a change in a voltage of a control electrode of a driving transistor due to leakage current, thereby preventing flicker that is perceptible by a user.

DETAILED DESCRIPTION

Figure 1:
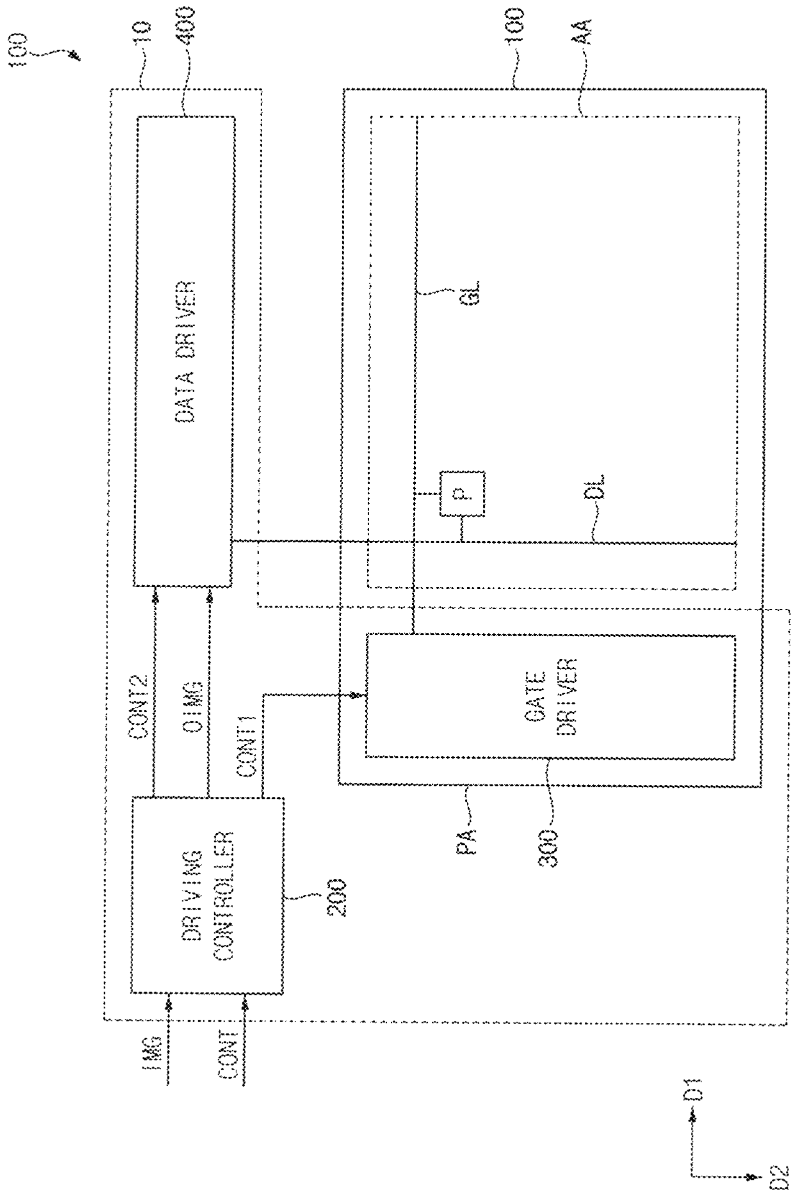
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device 1000 according to embodiments of the invention.

Referring to FIG. 1, an embodiment of the display device 1000 may include a display panel 100, a driving controller 200, a gate driver 300, and a data driver 400. In an embodiment, the driving controller 200 and the data driver 400 may be integrated into a single chip.

The display panel 100 has a display region AA, on which an image is displayed, and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixel circuits P electrically connected to the data lines DL and the gate lines GL. The gate lines GL may extend in a first direction D1 and the data lines DL may extend in a second direction D2 crossing the first direction D1.

The driving controller 200 may receive input image data IMG and an input control signal CONT from a host processor (e.g., a graphic processing unit; GPU). In an embodiment, for example, the input image data IMG may include red image data, green image data and blue image data. In such an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, and output image data OIMG based on the input image data IMG and the input control signal CONT.

The driving controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The driving controller 200 may receive the input image data IMG and the input control signal CONT, and generate the output image data OIMG. The driving controller 200 may output the output image data OIMG to the data driver 400.

The gate driver 300 may generate gate signals for driving the gate lines GL in response to the first control signal CONT1 input from the driving controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the output image data OIMG from the driving controller 200. The data driver 400 may convert the output image data OIMG into data voltages having an analog type. The data driver 400 may output the data voltage to the data lines DL.

Figure 2:
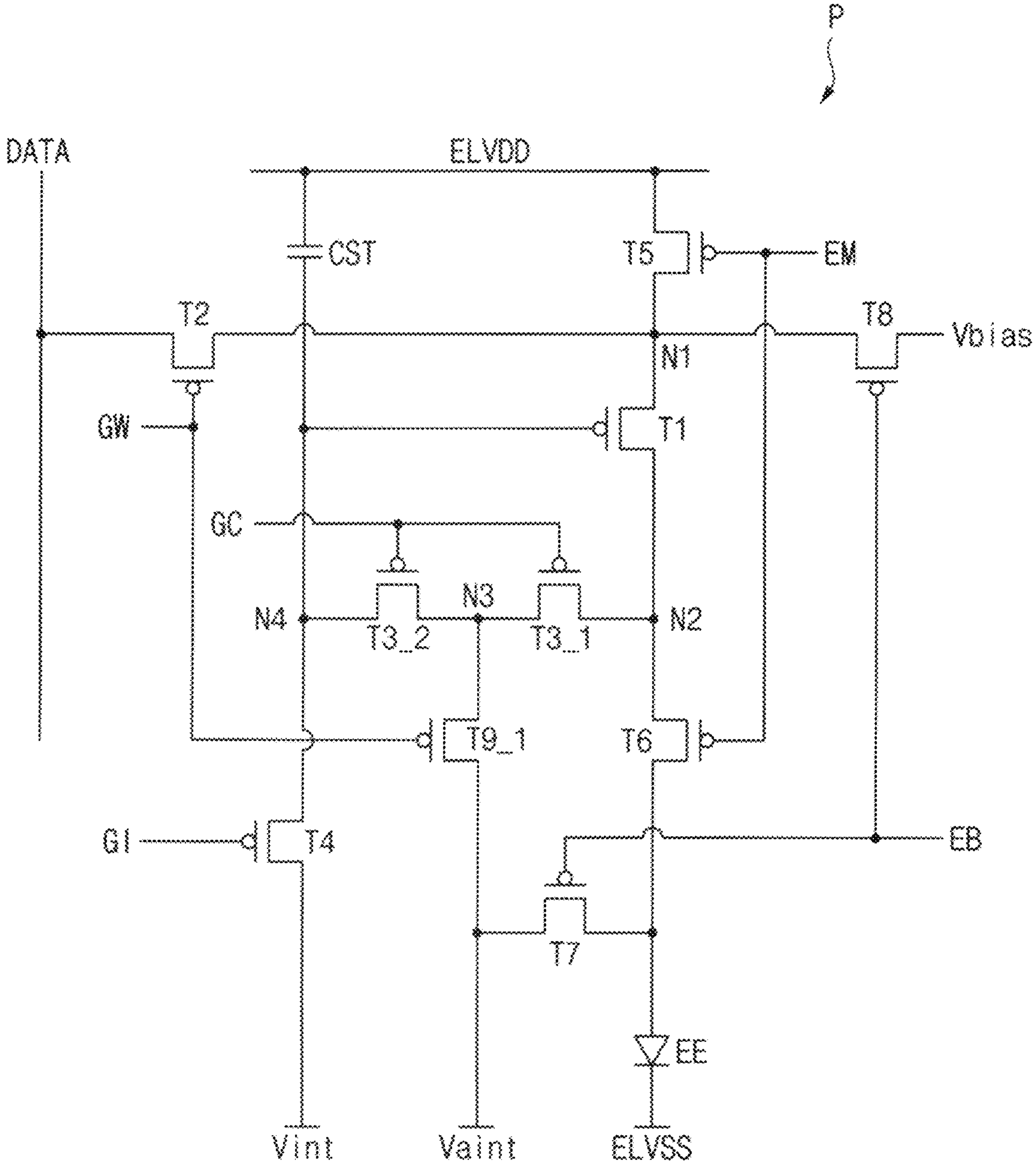
FIG. 2 is a circuit diagram illustrating a pixel circuit according to embodiments of the invention.
Figure 3:
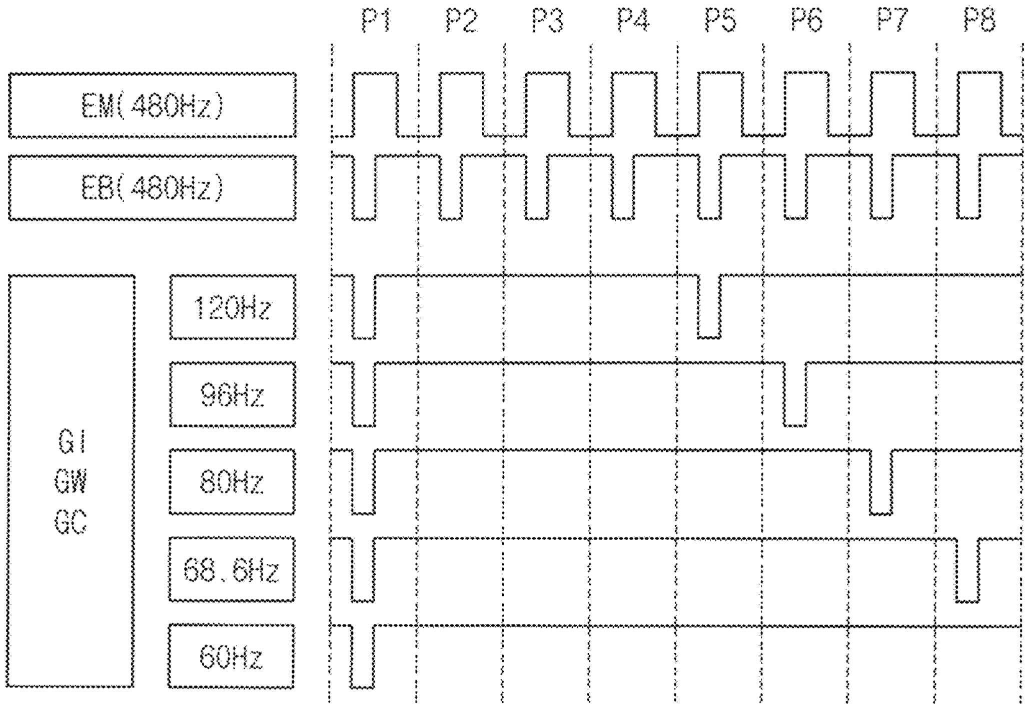
FIG. 3 is a timing diagram illustrating an embodiment in which the pixel circuit of FIG. 2 is driven.
Figure 4:
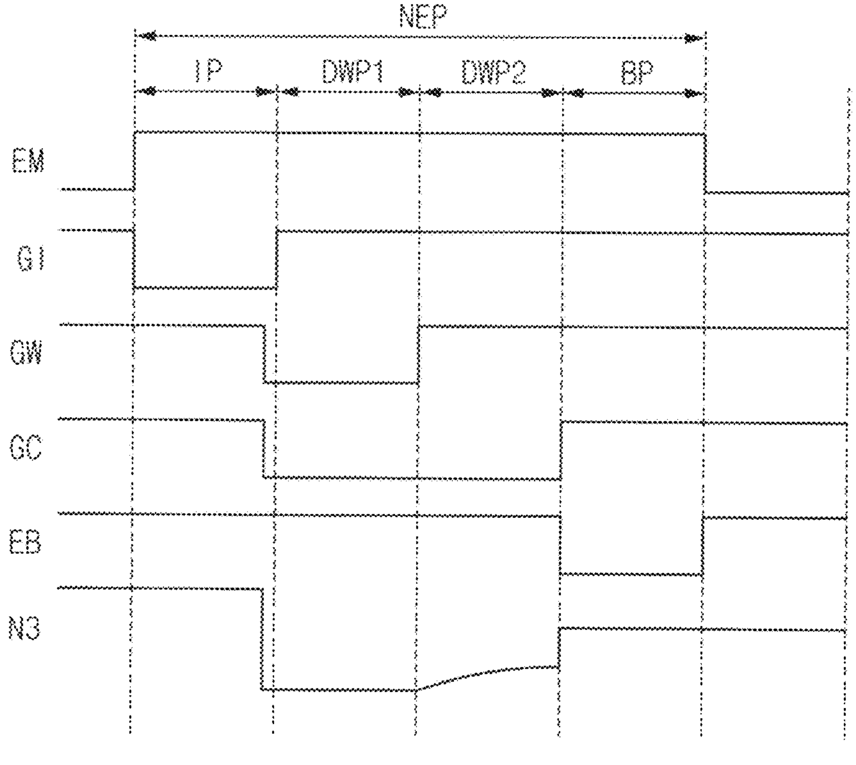
FIG. 4 is a timing diagram illustrating an embodiment in which the pixel circuit of FIG. 2 is driven in a non-emission period in which a gate initialization operation and a data writing operation are performed.

FIG. 2 is a circuit diagram illustrating the pixel circuit P according to embodiments of the invention, FIG. 3 is a timing diagram illustrating an embodiment in which the pixel circuit P of FIG. 2 is driven, and FIG. 4 is a timing diagram illustrating an embodiment in which the pixel circuit P of FIG. 2 is driven in a non-emission period in which a gate initialization operation and a data writing operation are performed. In an embodiment, as shown in FIGS. 3, and 4, an active level may be a low voltage level and an inactive level may be a high voltage level, but not being limited thereto. Alternatively, the active level may be a high voltage level and the inactive level may be a low voltage level depending on the types of the transistor in the circuit diagram.

Referring to FIG. 2, an embodiment of the pixel circuit P may include a light emitting element EE, a driving transistor T1 that applies a driving current to the light emitting element EE, a write transistor T2 including a control electrode that receives a write gate signal GW, a first electrode connected to a first electrode (i.e., a first node N1) of the driving transistor T1, and a second electrode that receives a data voltage, a first compensation transistor T3_1 including a control electrode that receives a compensation gate signal GC, a first electrode connected to a second electrode (i.e., a second node N2) of the driving transistor T1, and a second electrode connected to a first electrode (i.e., a third node N3) of a second compensation transistor T3_2, the second compensation transistor T3_2 including a control electrode that receives the compensation gate signal GC, the first electrode connected to the second electrode of the first compensation transistor T3_1, and a second electrode connected to a control electrode (i.e., a fourth node N4) of the driving transistor T1, a storage capacitor CST including a first electrode that receives a first power voltage ELVDD and a second electrode connected to the control electrode of the driving transistor, and a node control transistor T9_1 including a control electrode that receives the write gate signal GW, a first electrode connected to the second electrode of the first compensation transistor T3_1, and a second electrode. A first initialization voltage Vaint may be applied to the second electrode of the node control transistor T9_1. The pixel circuit P may further include an anode initialization transistor T7 including a control electrode that receives a bias signal EB, a first electrode connected to an anode electrode of the light emitting element EE, and a second electrode that receives the first initialization voltage Vaint, a gate initialization transistor T4 including a control electrode that receives an initialization gate signal GI, a first electrode connected to the control electrode of the driving transistor T1, and a second electrode that receives a second initialization voltage Vint, a first emission transistor T5 including a control electrode that receives an emission signal EM, a first electrode that receives the first power voltage ELVDD, and a second electrode connected to the first electrode of the driving transistor T1, a second emission transistor T6 including a control electrode that receives the emission signal EM, a first electrode connected to the second electrode of the driving transistor T1, and a second electrode connected to the anode electrode of the light emitting element EE, and a bias transistor T8 including a control electrode that receives the bias signal EB, a first electrode that receives a bias voltage Vbias, and a second electrode connected to the first electrode of the driving transistor T1. The light emitting element EE may include the anode electrode connected to the second electrode of the driving transistor T1 and a cathode electrode that receives a second power voltage ELVSS. The driving transistor T1 may include the control electrode connected to the second electrode of the storage capacitor CST, the first electrode connected to the first electrode of the write transistor T2, and the second electrode connected to the first electrode of the first compensation transistor T3_1. In an embodiment, the first initialization voltage Vaint may be less than the second initialization voltage Vint.

Referring to FIGS. 1 to 3, an embodiment of the display panel 100 may be driven with a variable driving frequency. In an embodiment, for example, the display panel 100 may be driven at a maximum of 120 hertz (Hz).

When the display panel 100 is driven at 120 Hz, the write gate signal GW and the compensation gate signal GC may have an active pulse in a first period P1 and a fifth period P5, and the data writing operation may be performed. That is, when the display panel 100 is driven at 120 Hz, the data writing operation may be performed at 120 Hz.

When the display panel 100 is driven at 120 Hz, the initialization gate signal GI may have an active pulse in the first period P1 and the fifth period P5, and a gate initialization operation may be performed. That is, when the display panel 100 is driven at 120 Hz, the gate initialization operation may be performed at 120 Hz.

A frequency of the bias signal EB may be greater than a frequency of the write gate signal GW. When the display panel 100 is driven at 120 Hz, the emission signal EM and the bias signal EB may have an active pulse in all period P1, P2, . . . , P8, and a light emitting operation and a biasing operation may be performed. When the display panel 100 is driven at 120 Hz, the light emitting operation of the light emitting element EE and the biasing operation of the driving transistor T1 may be performed at 480 Hz.

The display device 1000 may include a non-emission period in which the gate initialization operation and the data writing operation are performed and a non-emission period in which the gate initialization operation and the data writing operation are not performed. In an embodiment, for example, when the display panel 100 is driven at 120 Hz, the non-emission period of the first period P1 and the fifth period P5 (in FIG. 3, the period in which the emission signal EM has an inactive level) may be a non-emission period in which the gate initialization operation and the data writing operation are performed, and the non-emission period of a second period P2, a third period P3, a fourth period P4, a sixth period P6, a seventh period P7, and a eighth period P8 (in FIG. 3, the period in which the emission signal EM has an inactive level) may be a non-emission period in which the gate initialization operation and the data writing operation are not performed.

As the non-emission period in which the gate initialization operation and the data writing operation are not performed increases (i.e., as the driving frequency decreases), the period in which the data writing operation is performed may increase. As the period in which the data writing operation is performed increases, an influence of a leakage current on a voltage of the control electrode of the driving transistor T1 may increase. As a voltage of the third node N3 is greater than a voltage of the fourth node N4, the leakage current flowing to the control electrode of the driving transistor T1 may increase. The voltage of the control electrode of the driving transistor T1 may be changed by the leakage current flowing through the compensation transistors T3_1 and T3_2, such that a luminance of a displayed image may be changed. Accordingly, a flicker may be perceptible by a user.

Referring to FIGS. 1 to 4, the gate initialization operation may be performed in an initialization period IP of the non-emission period NEP in which the gate initialization operation and the data writing operation are performed. The data writing operation may be performed in a data writing period DWP1 and DWP2 of the non-emission period NEP in which the gate initialization operation and the data writing operation are performed. The biasing operation may be performed in a bias period BP of the non-emission period NEP in which the gate initialization operation and the data writing operation are performed.

In the initialization period IP of the non-emission period NEP in which the gate initialization operation and the data writing operation are performed, the initialization gate signal GI may have an active level, and the gate initialization transistor T4 may be in an on-state (i.e., current flows through the transistor.). Accordingly, the second initialization voltage Vint may be applied to the control electrode of the driving transistor T1. As the second initialization voltage Vint is applied to the control electrode of the driving transistor T1, the voltage of the control electrode of the driving transistor T1 may be initialized (i.e., the gate initialization operation may be performed).

In an embodiment, the write transistor T2, the first compensation transistor T3_1, and the second compensation transistor T3_2 may be turned on (from an off-state to the on-state) when the gate initialization transistor is in the on-state in the non-emission period NEP in which the gate initialization operation and the data writing operation are performed. In an embodiment, for example, since the write gate signal GW and the compensation gate signal GC have an active level in the initialization period IP, a time for writing the data voltage DATA into the storage capacitor CST may be further secured.

The node control transistor T9_1, the first compensation transistor T3_1, and the second compensation transistor T3_2 may be in the on-state in a first data writing period DWP1 of the non-emission period NEP in which the gate initialization operation and the data writing operation are performed. The node control transistor T9_1 may be in an off-state (i.e., no current flows through the transistor) and the first compensation transistor T3_1 and the second compensation transistor T3_2 may be in the on-state in a second data writing period DWP2 of the non-emission period NEP in which the gate initialization operation and the data writing operation are performed after the first data writing period DWP1.

In the first data write period DWP1 of the non-emission period NEP in which the gate initialization operation and the data write operation are performed, the write gate signal GW and the compensation gate signal GC may have an active level, and the write transistor T2, the node control transistor T9_1, the first compensation transistor T3_1, and the second compensation transistor T3_2 may be in the on-state. Accordingly, a voltage compensated for the threshold voltage of the driving transistor T1 in the data voltage may be stored in the storage capacitor CST (i.e., the data writing operation may be performed).

In the second data writing period DWP2 of the non-emission period NEP in which the gate initialization operation and the data writing operation are performed, the write gate signal GW may have an inactive level, and the compensation gate signal GC may have an active level, the write transistor T2 and the node control transistor T9_1 may be in the off-state, and the first compensation transistor T3_1 and the second compensation transistor T3_2 may be in the on-state. Accordingly, a time for writing the data voltage DATA to the storage capacitor CST may be further secured.

In the bias period BP of the non-emission period NEP in which the gate initialization operation and the data write operation are performed and a bias period of the non-emission period in which the gate initialization operation and the data write operation are not performed, the bias signal EB may have an active level, and the bias transistor T8 may be in the on-state. Accordingly, the bias voltage Vbias may be applied to the first electrode of the driving transistor T1, and a hysteresis characteristic of the driving transistor T1 may be initialized by the bias voltage Vbias (i.e., the biasing operation may be performed).

In an embodiment, as shown in FIGS. 3 and 4, the bias signal EB may include a single active pulse in one non-emission period, but is not limited thereto. In an alternative embodiment, for example, the bias signal EB may include two or more active pulses in one non-emission period.

In the emission period, the emission signal EM may have an active level, and the first emission transistor T5 and the second emission transistor T6 may be in the on-state. Accordingly, the first power voltage ELVDD may be applied to the first electrode of the driving transistor T1, the driving current generated by the driving transistor T1 may be applied to the light emitting element EE, and the light emitting element EE may be emit light (i.e., the light emitting operation may be performed).

When the compensation gate signal GC is turned on (i.e., when the compensation gate signal GC change from an inactive level to an active level), the voltage of the third node N3 may increase by a kickback voltage. When the write gate signal GW has the active level, the node control transistor T9_1 may be turned on, and as the node control transistor T9_1 is turned on, the first initialization voltage Vaint may be applied to the third node N3. The voltage of the third node N3 may be lowered by the first initialization voltage Vaint. Accordingly, a voltage difference between the third node N3 and the fourth node N4 may be reduced, and the leakage current flowing through the compensation transistors T3_1 and T3_2 may be reduced.

Figure 5:
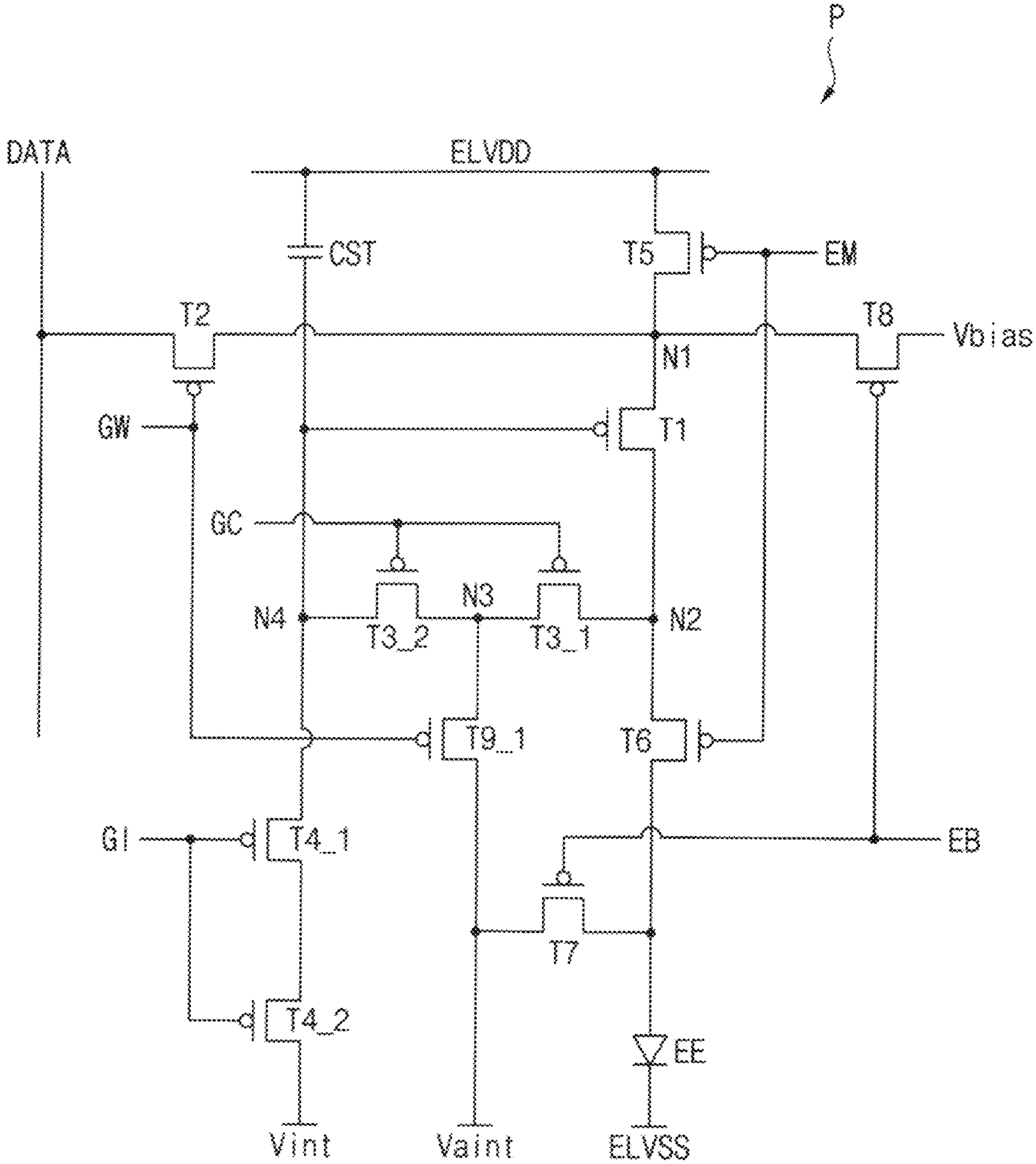
FIG. 5 is a circuit diagram illustrating a pixel circuit according to embodiments of the invention.

FIG. 5 is a circuit diagram illustrating the pixel circuit P according to embodiments of the invention.

The pixel circuit P shown in FIG. 5 is substantially the same as the pixel circuit P of FIG. 2 except for a gate initialization transistor. Thus, the same reference numerals are used to refer to the same or similar element, and any repetitive detailed description thereof will be omitted.

Referring to FIG. 5, in an embodiment, the gate initialization transistor is configured as a dual, that is, defined by two transistors connected to each other in series and with gate electrodes that receive a same signal as each other. Here, In an embodiment, for example, the gate initialization transistor may include a first gate initialization transistor T4_1 including a control electrode that receives the initialization gate signal GI, a first electrode connected to the second electrode of the second compensation transistor T3_2, and a second electrode connected to a first electrode of a second gate initialization transistor T4_2, and the second gate initialization transistor T4_2 including a control electrode that receives the initialization gate signal GI, a first electrode connected to the second electrode of the first gate initialization transistor T4_1, and a second electrode that receives the second initialization voltage Vint.

Figure 6:
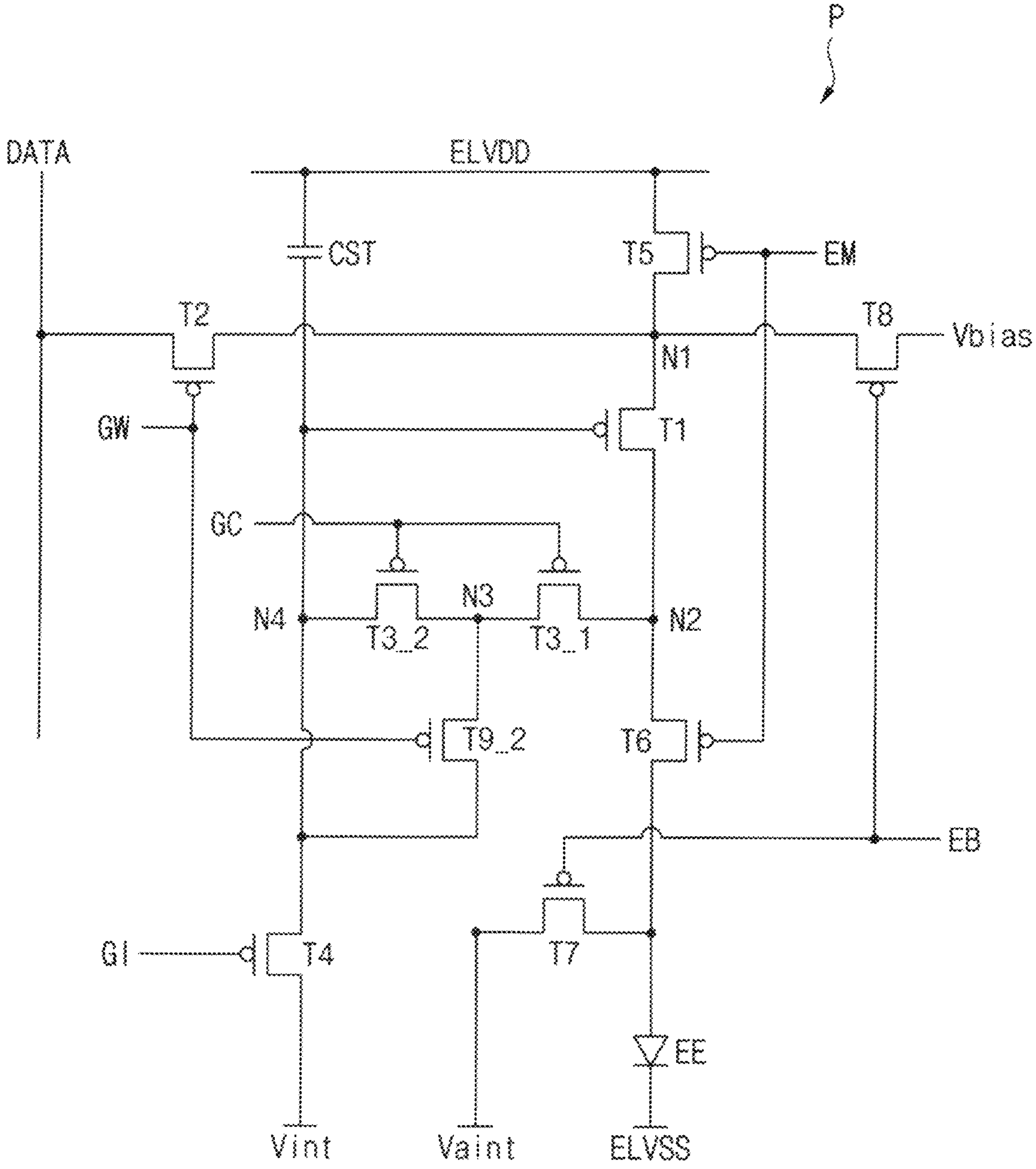
FIG. 6 is a circuit diagram illustrating a pixel circuit according to embodiments of the invention.

FIG. 6 is a circuit diagram illustrating the pixel circuit P according to embodiments of the invention.

The pixel circuit P shown in FIG. 6 is substantially the same as the pixel circuit P of FIG. 2 except for a node control transistor T9_2. Thus, the same reference numerals are used to refer to the same or similar element, and any repetitive detailed description thereof will be omitted.

Referring to FIGS. 4 and 6, in an embodiment, the pixel circuit P may include the node control transistor T9_2 including a control electrode that receives the write gate signal GW, a first electrode connected to the second electrode of the first compensation transistor T3_1, and a second electrode connected to the first electrode of the gate initialization transistor T4.

The write transistor T2, the first compensation transistor T3_1, and the second compensation transistor T3_2 may be turned on (or changed from the off-state to the on-state) when the gate initialization transistor T4 is in the on-state in the non-emission period NEP in which the gate initialization operation and the data writing operation are performed. In an embodiment, for example, since the write gate signal GW and the compensation gate signal GC have an activation level in the initialization period IP, a time for writing the data voltage DATA into the storage capacitor CST may be further secured.

When the write gate signal GW and the initialization gate signal GI have activation levels, the gate initialization transistor T4 and the node control transistor T9_2 may be turned on, and as the gate initialization transistor T4 and the node control transistor T9_2 are turned on, the second initialization voltage Vint may be applied to the third node N3. The voltage of the third node N3 may be lowered by the second initialization voltage Vint. Accordingly, a voltage difference between the third node N3 and the fourth node N4 may be reduced, and the leakage current flowing through the compensation transistors T3_1 and T3_2 may be reduced.

In an alternative embodiment, the write gate signal GW and the compensation gate signal GC may have inactive levels in the initialization period IP. In such an embodiment, when the write gate signal GW has an activation level in the first data writing period DWP1, the node control transistor T9_2 may be turned on, and as the node control transistor T9_2 is turned on, the voltage of the fourth node N4 on which the initialization operation is performed may be applied to the third node N3. The voltage of the third node N3 may be lowered by the voltage of the fourth node N4 on which the initialization operation is performed.

Figure 7:
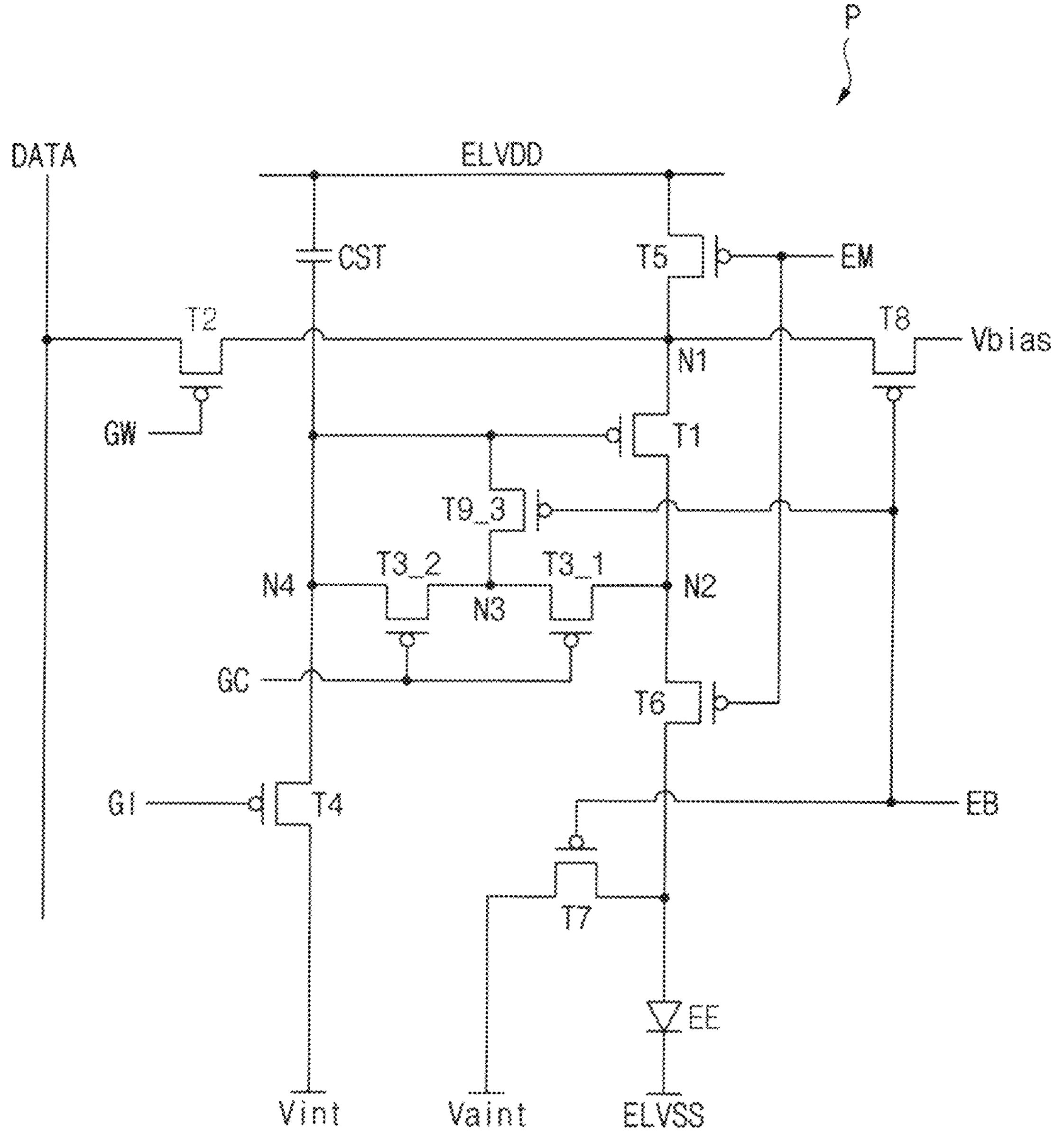
FIG. 7 is a circuit diagram illustrating a pixel circuit according to embodiments of the invention.

FIG. 7 is a circuit diagram illustrating the pixel circuit P according to embodiments of the invention.

The pixel circuit P shown in FIG. 7 is substantially the same as the pixel circuit P of FIG. 2 except for a node control transistor T9_3. Thus, the same reference numerals are used to refer to the same or similar element, and any repetitive detailed description thereof will be omitted.

Referring to FIGS. 4 and 7, in an embodiment, the pixel circuit P may include the node control transistor T9_3 including a control electrode that receives the bias signal EB, a first electrode connected to the control electrode of the driving transistor T1, and a second electrode connected to the second electrode of the first compensation transistor T3_1.

When the bias signal EB has an activation level, the node control transistor T9_3 may be turned on, and as the node control transistor T9_3 is turned on, the third node N3 and the control node of the driving transistor T1 may be connected. That is, the voltage of the third node N3 may decrease until the voltage of the third node N3 and the voltage of the control electrode (i.e., the fourth node N4) of the driving transistor T1 become the same as each other. Accordingly, a voltage difference between the third node N3 and the fourth node N4 may be reduced, and the leakage current flowing through the compensation transistors T3_1 and T3_2 may be reduced.

Figure 8:
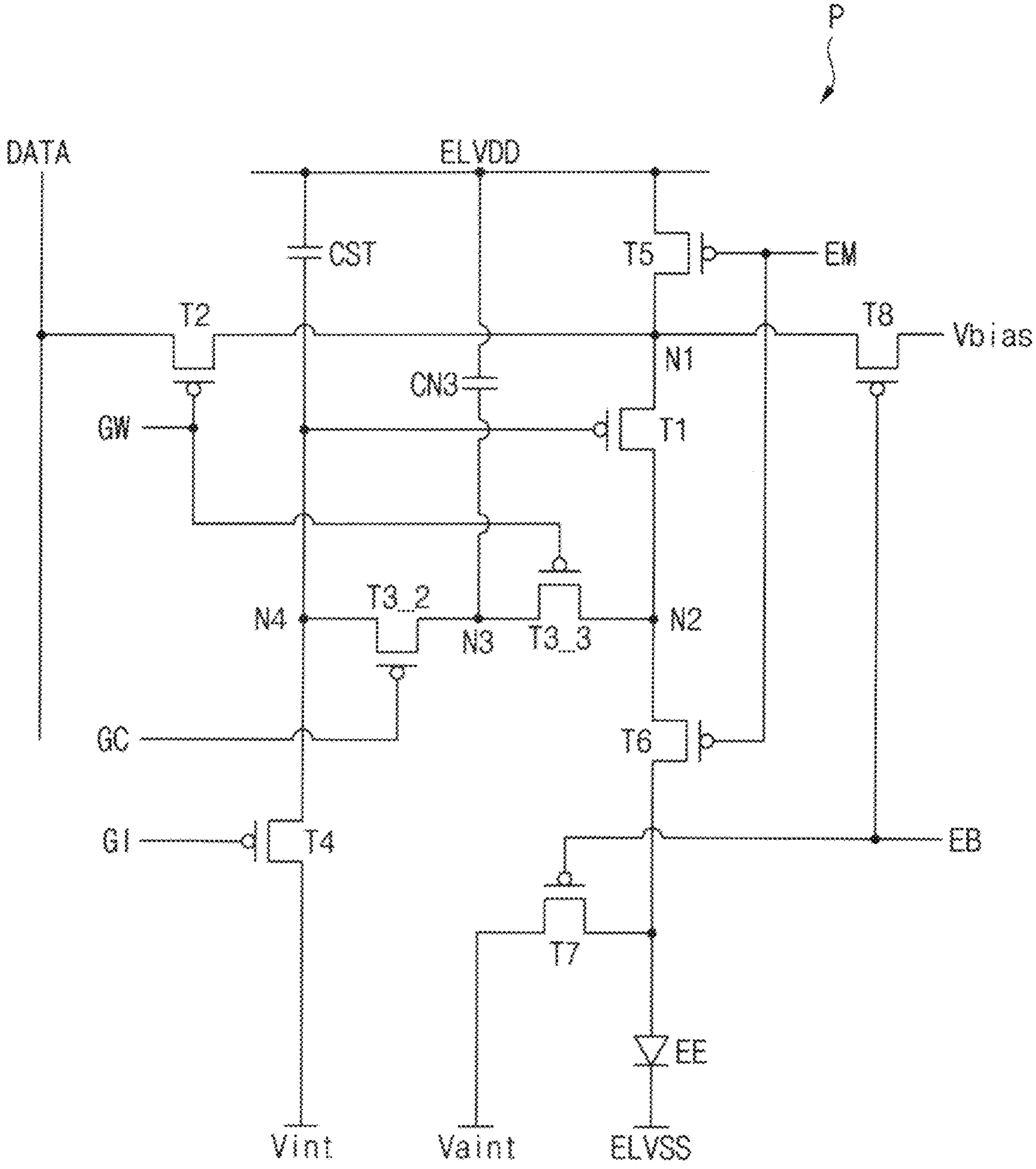
FIG. 8 is a circuit diagram illustrating a pixel circuit according to embodiments of the invention.
Figure 9:
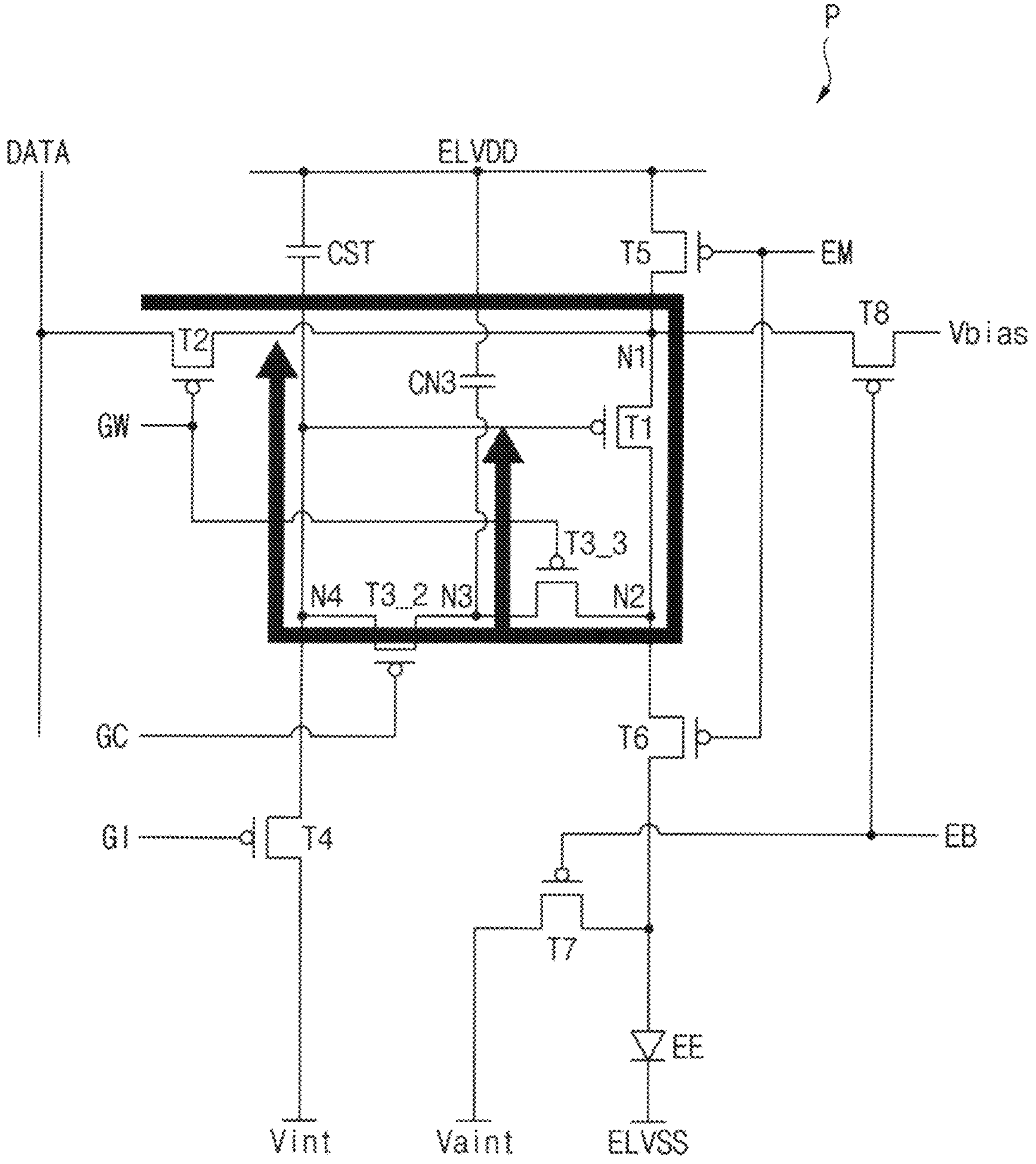
FIG. 9 is a circuit diagram illustrating an embodiment in which the pixel circuit of FIG. 8 operates in a first data writing period.
Figure 10:
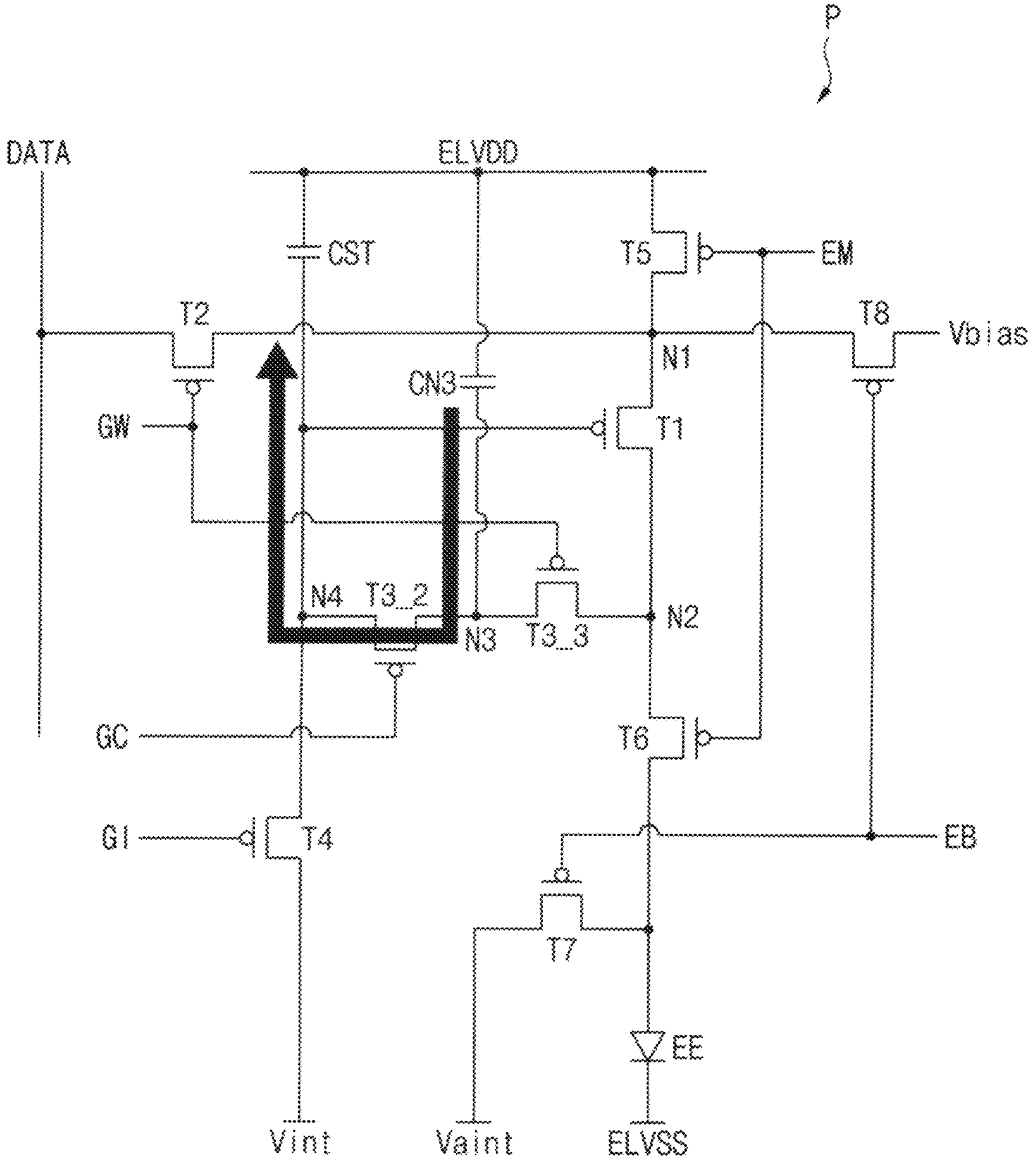
FIG. 10 is a circuit diagram illustrating an embodiment in which the pixel circuit of FIG. 8 operates in a second data writing period.

FIG. 8 is a circuit diagram illustrating a pixel circuit P according to embodiments of the invention, FIG. 9 is a circuit diagram illustrating an embodiment in which the pixel circuit P of FIG. 8 operates in the first data writing period DWP1, and FIG. 10 is a circuit diagram illustrating an embodiment in which the pixel circuit P of FIG. 8 operates in a second data writing period DWP2.

The pixel circuit P shown in FIG. 8 is substantially the same as the pixel circuit P of FIG. 2 except for a first compensation transistor T3_3 and except that a node control capacitor CN3 is added, and the node control transistor T9_1 of FIG. 2 is omitted. Thus, the same reference numerals are used to refer to the same or similar element, and any repetitive detailed description thereof will be omitted.

Referring to FIGS. 4 and 8, in an embodiment, the pixel circuit P may include the first compensation transistor T3_3 including a control electrode that receives the write gate signal GW, a first electrode connected to the second electrode of the driving transistor T1, and a second electrode connected to a first electrode of the second compensation transistor T3_2, and the node control capacitor CN3 including a first electrode that receives the first power voltage ELVDD and a second electrode connected to the second electrode of the first compensation transistor T3_3. A capacitance of the storage capacitor CST may be greater than a capacitance of the node control capacitor CN3.

In the first data write period DWP1 of the non-emission period NEP in which the gate initialization operation and the data write operation are performed, the write gate signal GW and the compensation gate signal GC may have an active level, and the write transistor T2, the first compensation transistor T3_3, and the second compensation transistor T3_2 may be in the on-state. Accordingly, a voltage may be stored in the storage capacitor CST and the node control capacitor CN3. However, during the first data writing period DWP1, a voltage compensated for the threshold voltage of the driving transistor T1 in the data voltage DATA may not be fully charged (e.g., in a case where the storage capacitor CST has a large capacitance).

In the second data writing period DWP2 of the non-emission period NEP in which the gate initialization operation and the data writing operation are performed, the write gate signal GW may have an inactive level, and the compensation gate signal GC may have an active level, the write transistor T2 and the first compensation transistor T3_3 may be in the off-state, and the second compensation transistor T3_3 may be in the on-state. During the second data writing period DWP2, a voltage compensated for the threshold voltage of the driving transistor T1 in the data voltage DATA may be fully charged in the storage capacitor CST due to a voltage charged in the node control capacitor CN3.

Accordingly, since only the second compensation transistor T3_2 may be turned off (or changed from the off-state to the on-state) (the first compensation transistor T3_3 may be already in the off-state) when the second data writing period DWP ends, a voltage rise of the third node N3 due to the kickback voltage may be reduced. Accordingly, a voltage difference between the third node N3 and the fourth node N4 may be reduced, and the leakage current flowing through the compensation transistors T3_2 and T3_3 may be reduced.

Figure 11:
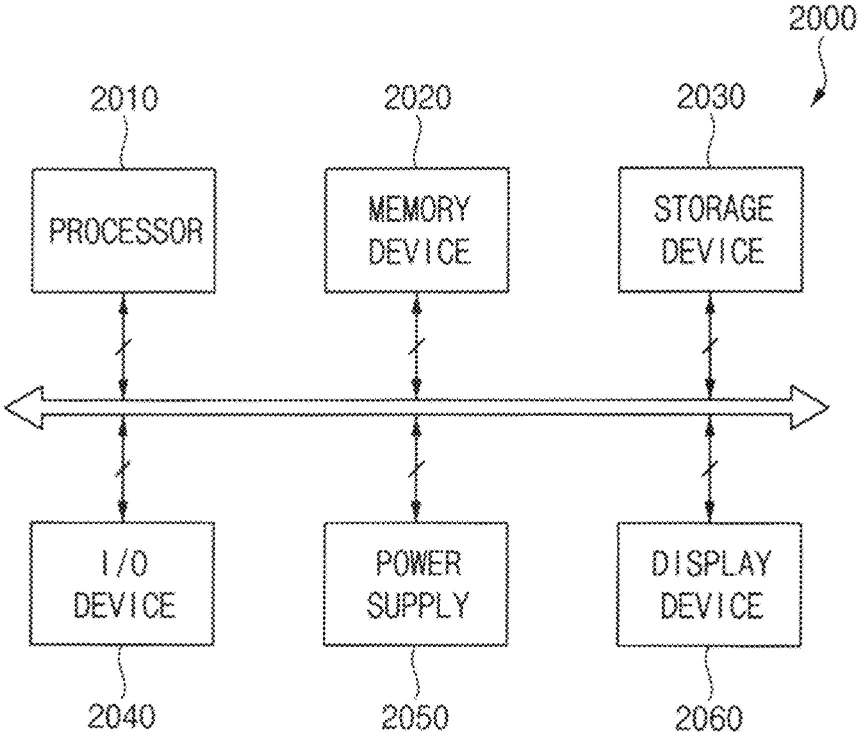
FIG. 11 is a block diagram showing an electronic device according to embodiments.
Figure 12:
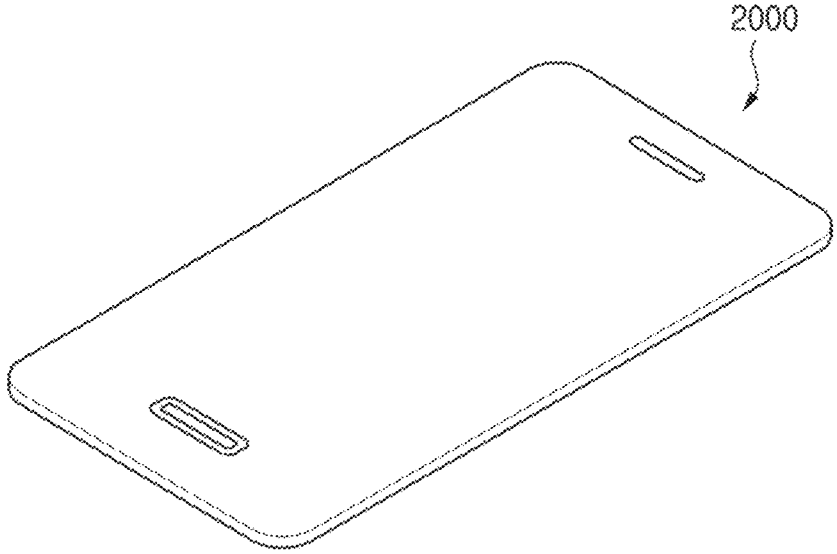
FIG. 12 is a diagram showing an embodiment in which the electronic device of FIG. 11 is implemented as a smart phone.

FIG. 11 is a block diagram showing an electronic device according to embodiments, and FIG. 12 is a diagram showing an embodiment in which the electronic device of FIG. 11 is implemented as a smart phone.

Referring to FIGS. 11 and 12, an embodiment of the electronic device 2000 may include a processor 2010, a memory device 2020, a storage device 2030, an input/output (I/O) device 2040, a power supply 2050, and a display device 2060. In such an embodiment, the display device 2060 may be the display device 1000 of FIG. 1. In an embodiment, the electronic device 2000 may further include a plurality of ports for communicating with a video card, a sound card, a memory card, a universal serial bus (USB) device, other electronic devices, etc. In an embodiment, as shown in FIG. 12, the electronic device 2000 may be implemented as a smart phone. However, embodiments of the electronic device 2000 are not limited thereto. In an alternative embodiment, for example, the electronic device 2000 may be implemented as a cellular phone, a video phone, a smart pad, a smart watch, a tablet personal computer (PC), a car navigation system, a computer monitor, a laptop, a head mounted display (HMD) device, etc.

The processor 2010 may perform various computing functions. The processor 2010 may be a micro-processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. In an embodiment, for example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. In an embodiment, for example, the power supply 2050 may be a power management integrated circuit (PMIC).

The display device 2060 may display an image corresponding to visual information of the electronic device 2000. In an embodiment, for example, the display device 2060 may be an organic light emitting display device or a quantum dot light emitting display device, but is not limited thereto. In an embodiment, the display device 2060 may lower a voltage of a node between the first compensation transistor and the second compensation transistor such that a change of the voltage of the control electrode of the driving transistor due to the leakage current may be minimized.

Embodiments of the invention may be applied to any electronic device including a display device. In an embodiment, for example, the inventions may be applied to a television (TV), a digital TV, a three dimensional (3D) TV, a mobile phone, a smart phone, a tablet computer, a virtual reality (VR) device, a wearable electronic device, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A pixel circuit comprising:

a light emitting element;

a driving transistor which applies a driving current to the light emitting element;

a write transistor including a control electrode which receives a write gate signal, a first electrode connected to a first electrode of the driving transistor, and a second electrode which receives a data voltage;

a first compensation transistor including a control electrode which receives a compensation gate signal, a first electrode connected to a second electrode of the driving transistor, and a second electrode connected to a first electrode of a second compensation transistor;

the second compensation transistor including a control electrode which receives the compensation gate signal, the first electrode connected to the second electrode of the first compensation transistor, and a second electrode connected to a control electrode of the driving transistor;

a storage capacitor including a first electrode which receives a first power voltage and a second electrode connected to the control electrode of the driving transistor; and a node control transistor including a control electrode which receive the write gate signal, a first electrode directly connected to only the second electrode of the first compensation transistor and the first electrode of the second compensation transistor, and a second electrode.

2. The pixel circuit of claim 1, wherein a first initialization voltage is applied to the second electrode of the node control transistor.

3. The pixel circuit of claim 1, further comprising:

a gate initialization transistor including a control electrode which receives an initialization gate signal, a first electrode connected to the control electrode of the driving transistor, and a second electrode which receives a second initialization voltage, and wherein the second electrode of the node control transistor is connected to the first electrode of the gate initialization transistor.

4. The pixel circuit of claim 3, wherein the write transistor, the first compensation transistor, and the second compensation transistor are turned on from an off-state to an on-state when the gate initialization transistor is in the on-state in a non-emission period in which a gate initialization operation and a data writing operation are performed.

5. The pixel circuit of claim 1, wherein the node control transistor, the first compensation transistor, and the second compensation transistor are in an on-state in a first data writing period of a non-emission period in which a gate initialization operation and a data writing operation are performed, and wherein the node control transistor is in an off-state and the first compensation transistor and the second compensation transistor are in the on-state in a second data writing period of the non-emission period after the first data writing period.

6. The pixel circuit of claim 1, further comprising:

an anode initialization transistor including a control electrode which receives a bias signal, a first electrode connected to an anode electrode of the light emitting element, and a second electrode which receives a first initialization voltage;

a gate initialization transistor including a control electrode which receives an initialization gate signal, a first electrode connected to the control electrode of the driving transistor, and a second electrode which receives a second initialization voltage;

a first emission transistor including a control electrode which receives an emission signal, a first electrode which receives the first power voltage, and a second electrode connected to the first electrode of the driving transistor;

a second emission transistor including a control electrode which receives the emission signal, a first electrode connected to the second electrode of the driving transistor, and a second electrode connected to the anode electrode of the light emitting element; and a bias transistor including a control electrode which receives the bias signal, a first electrode which receives a bias voltage, and a second electrode connected to the first electrode of the driving transistor.

7. The pixel circuit of claim 6, wherein the gate initialization transistor is configured as a dual.

8. The pixel circuit of claim 6, wherein a frequency of the bias signal is greater than a frequency of the write gate signal.

* * * * *